United States Patent [19]
Baxter et al.

[11] Patent Number: 5,944,818
[45] Date of Patent: *Aug. 31, 1999

[54] METHOD AND APPARATUS FOR ACCELERATED INSTRUCTION RESTART IN A MICROPROCESSOR

[75] Inventors: Jeff J. Baxter, Cupertino; Mike J. Morrison, San Jose; Anand B. Pai, San Jose; Nazar A. Zaidi, San Jose, all of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,409

[22] Filed: Jun. 28, 1996

[51] Int. Cl.$^6$ .................................................. G06F 9/40
[52] U.S. Cl. ................................................ 712/244
[58] Field of Search .................................. 712/244, 214, 712/233

[56] References Cited

U.S. PATENT DOCUMENTS

| | | | |
|---|---|---|---|
| 3,789,365 | 1/1974 | Jen | 710/264 |
| 4,521,850 | 6/1985 | Wilhite et al. | 395/376 |
| 4,791,557 | 12/1988 | Angel et al. | 395/591 |
| 5,012,403 | 4/1991 | Keller et al. | 712/228 |
| 5,134,693 | 7/1992 | Saini | 395/591 |
| 5,437,017 | 7/1995 | Moore et al. | 395/400 |
| 5,696,955 | 12/1997 | Goddard et al. | 395/563 |

OTHER PUBLICATIONS

Popescu, "The Metaflow Architecture" IEEE , 1991, pp. 10–13, 63–73, Jun. 1991.

*Primary Examiner*—David Y. Eng
*Attorney, Agent, or Firm*—Calvin E. Wells

[57] ABSTRACT

A system for accelerating instruction restart in a microprocessor. An instruction is fetched. The instruction is placed in a macro-instruction queue and sent to the decoder. The instruction is decoded in order to produce at least one micro-operation. The micro-operation is executed, and the microprocessor checks for instruction restart conditions. If an instruction restart condition is found, the instruction restart function is performed. The instruction restart function includes decoding the instruction stored in the macro-instruction queue and executing the corresponding micro-operations.

17 Claims, 6 Drawing Sheets

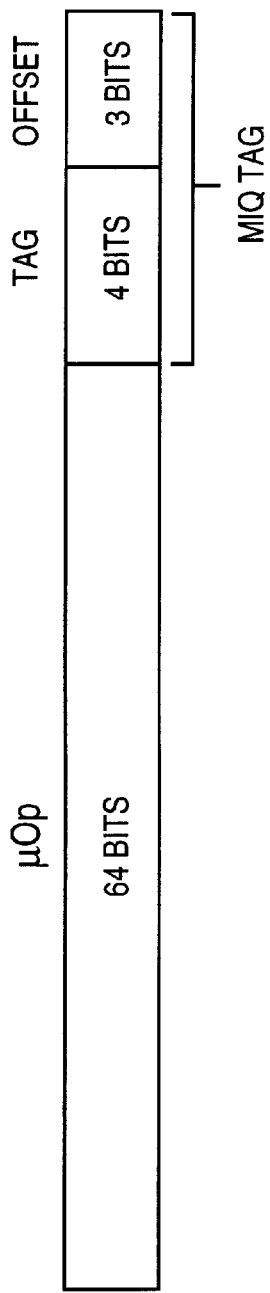

METHOD AND APPARATUS FOR ACCELERATED INSTRUCTION RESTART IN A MICROPROCESSOR

BACKGROUND OF THE INVENTION

1. Field of the Invention

The present invention pertains to the field of integrated circuits. More particularly, this invention relates to accelerating instruction restart in a microprocessor.

2. Background of the Related Art

In a micro-coded microprocessor, a set of macro-instruction bytes are decomposed into a sequence of micro-operations by an instruction decoder. These micro-operations flow through the processor and are eventually executed and retired. As these micro-operations flow through the machine and are executed, it may be found that a micro-operation may require special handling, separate from the normal micro-code flow. This event is referred to as an exception. The exception causes the processor to stall the normal micro-operation flow, and causes the processor to execute a micro-coded exception handler, which will attempt to cure the situation that resulted in the exception. If the micro-coded exception handler is able to correct the situation, the macro-instruction must be restarted from the micro-operation following the excepting micro-operation. This situation is called instruction restart. In order for the processor to perform this task, the original instruction bytes must be presented to the instruction decoder. Thus, the microprocessor must maintain the instruction bytes for any macro-instruction alive in the machine.

Pipelined microprocessors pose particular challenges in the area of instruction restart. In a pipelined microprocessor, instruction processing functions such as fetch, decode, and execute are performed simultaneously. Each instruction executed by the microprocessor flows through the pipeline sequentially, for example from the fetch stage to the decode stage, then to the execute stage. This allows the microprocessor to execute several instructions at a time, with each instruction at a different stage in the pipeline. Also, microprocessors may include more than a single pipeline to further improve throughput. Greater instruction throughput can be achieved by increasing the depth of the pipeline, which means increasing the number of stages an instruction must flow through before being retired. This allows more instructions to be processed at one time. As the number of stages increases, each stage is made more simple. Since each of the stages is less complex, each stage requires less time to complete, and the microprocessor's clock speed can be increased. This increases instruction throughput.

The challenges presented by deeply pipelined microprocessors in performing instruction restart include guaranteeing the maintenance of the required instructions and minimizing performance penalties. Performance penalties result from the need to flush the pipeline and re-fetch the instructions needed for instruction restart whenever an exception occurs. In a pipelined microprocessor, whenever an exception occurs the pipeline must be flushed before the instruction restart can begin. In deeply pipelined processors this results in a significant performance penalty.

A deeply pipelined microprocessor must maintain many instructions for instruction restart purposes. Instruction caches generally do not guarantee that the instructions will be maintained due to replacement of cache lines, possible invalidation, and self-modifying code. Self-modifying code may allow the modification of instructions contained in a cache. Instruction restart requires the original instructions to be maintained. Methods for maintaining the required instructions include the use of prefecth buffers and specialized caches. These buffers and caches are positions in the pipeline before the fetch stage. The prefecth buffer is used in microprocessors with very short pipelines, resulting in very few instructions alive in the processor at any given time. Thus, little or no special handling is required to ensure the maintenance of the required insturctions. For microprocessors with moderate pipeline depth, specialized caches are used. Replacement of lines in these caches is maintained by the microarchitecture so that any instructions alive in the machine are guaranteed to be in the cache.

These methods, in addition to being increasingly difficult to implement as pipeline depthes increase, also share the disadvantage of imposing undesirable preformance penalties due to the need re-fetch instructions from either the pre-fetch queue or the specialized cache.

SUMMARY INVENTION

The present invention provides a method and apparatus for accelerating instruction restart in a microprocessor.

In the present invention, one processing stage delivers information to a second processing stage, as well as to a queue. The queue is also capable of delivering its stored information to the second stage. A control signal is coupled to the first stage and to the queue. When the control signal is negated, information flows from the first stage to second stage. When the control signal is asserted, the first stage halts sending information, and the queue delivers its stored information to the second stage.

BRIEF DESCRIPTION OF THE DRAWINGS

FIG. 6a depicts one embodiment of a macro-instruction queue data field configured in accordance with the teachings of the present invention.

FIG. 6b depicts one embodiment of a macro-instruction queue tag configured in accordance with the teachings of the present invention.

DETAILED DESCRIPTION

Methods and apparatus for accelerating instruction restart in a microprocessor are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention.

For the purposes of illustration, the present invention is described in the context of an architecture and instructions compatible with the Intel® microprocessor architecture (Intel is a registered trademark of Intel Corporation). However, it is contemplated that the present invention may be practiced with other instruction sets and architectures as well, including reduced instruction set computers (RISC). In the following description, the exemplary instructions supplied to the decoder (termed "macro-instructions") have the well-known format of the Intel instruction set which is described, for example, in the *i486™ Programmers Reference Manual*, 1990, available from Intel Corporation, and the *Pentium™ Processor User's Manual*, Volume 3, 1994, also available from Intel Corporation.

Figure 1:
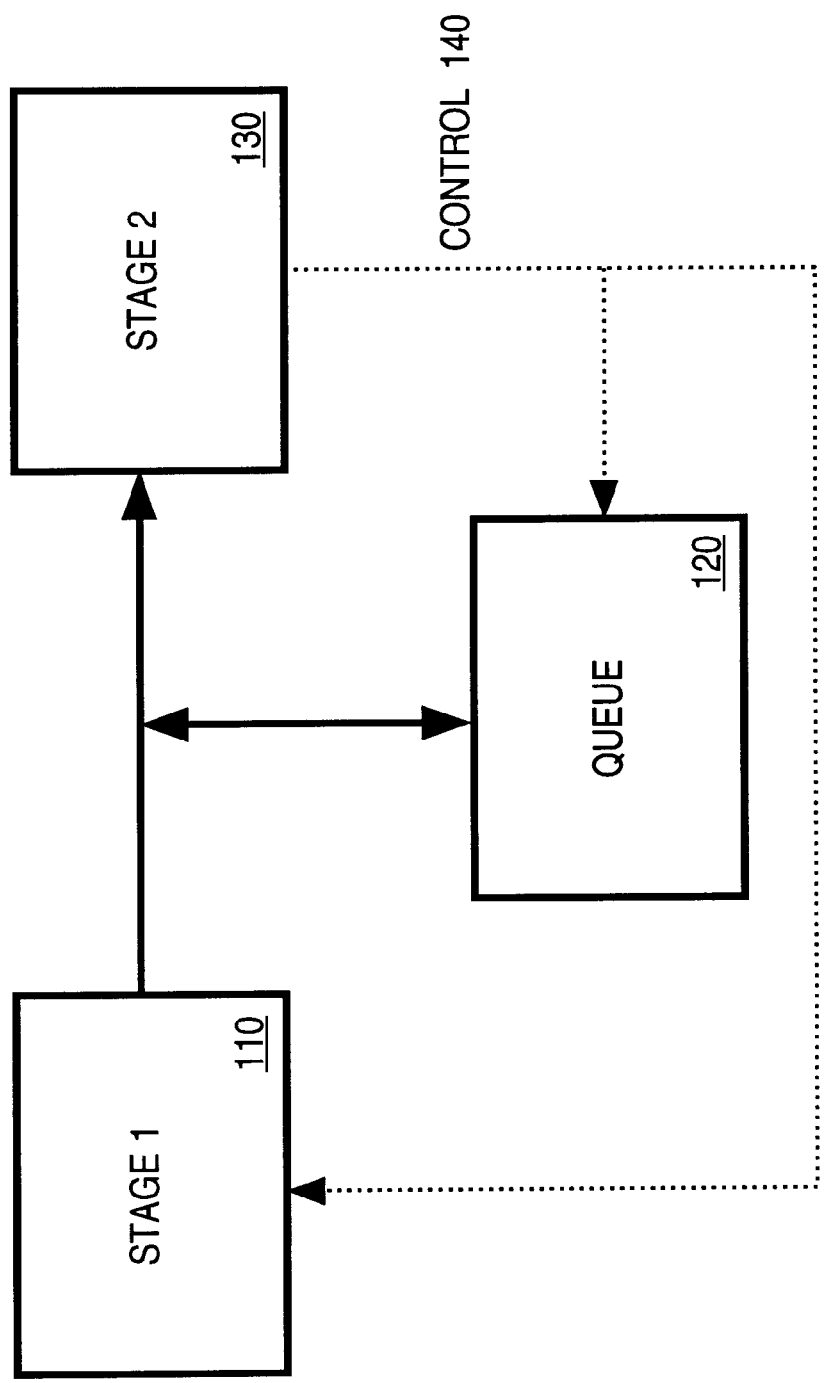
FIG. 1 is a block diagram of one embodiment of two processing stages configured in accordance with the teachings of the present invention.

FIG. 1 is a block diagram of one embodiment of two processing stages configured in accordance with the present invention. The present invention may be practiced with Stage 1 110 and Stage 2 130 implemented to perform any of a number of different processing functions, including instruction fetch, instruction decode, instruction execution, etc. Stage 1 110 first processes some information, then distributes the processed information to both Stage 2 130 and the queue 120. The queue stores the information for later retrieval. Stage 2 performs additional processing on the supplied information. If there is any condition that requires Stage 2 130 to receive a copy of the original information, Stage 2 130 asserts the control signal 140. When the control signal is asserted, Stage 1 110 ceases sending information to Stage 2 130, and the Queue 120 delivers its stored information to Stage 2. Keeping the information in the Queue and having it readily available in the event that Stage 2 130 requires it saves the time required for Stage 1 110 to re-create or reprocess the information.

While in the present embodiment Stage 2 130 maintains the state of the control signal 140, other functional units may maintain the state of the control signal without deviating from the spirit and scope of the present invention.

Figure 2:
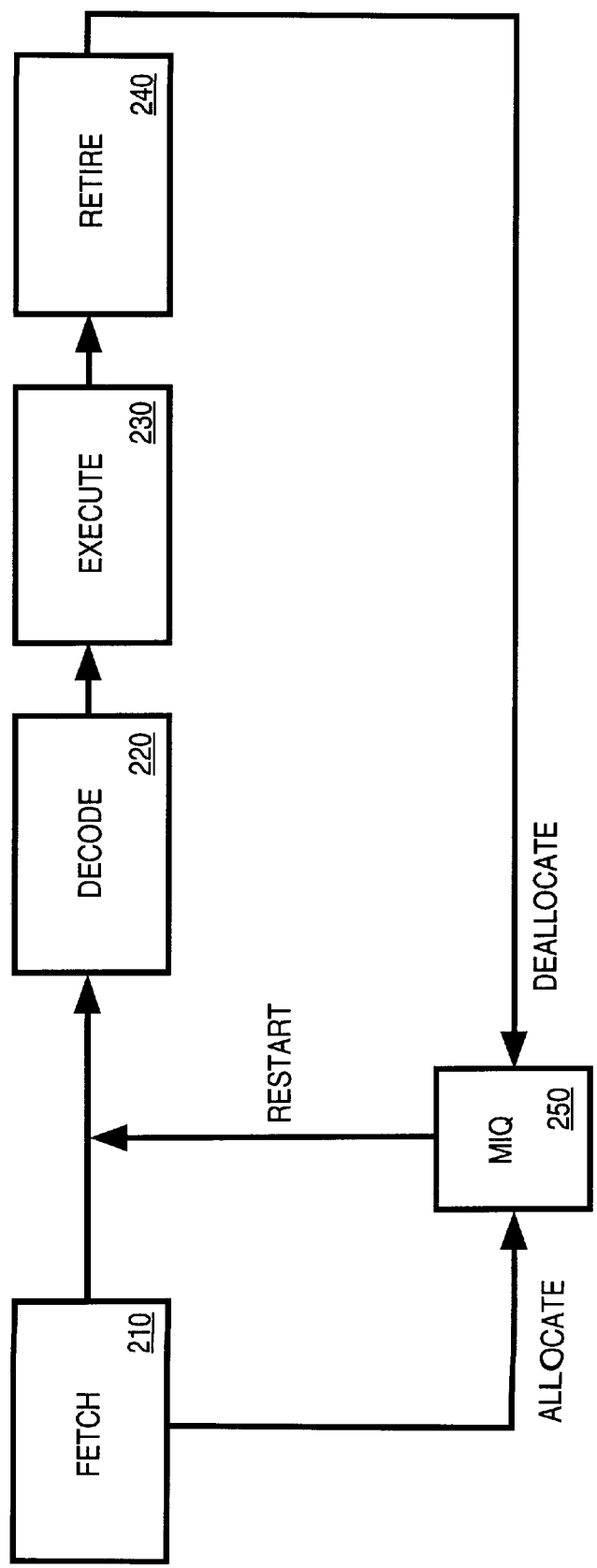
FIG. 2 is a block diagram of one embodiment of a microprocessor configured in accordance with the teachings of the present invention.

FIG. 2 is a block diagram of one embodiment of a microprocessor configured in accordance with the present invention. A basic microprocessor pipeline is represented by the Fetch 210, Decode 220, Execute 230, and Retire 240 blocks. The present invention adds a macro-instruction queue (MIQ) 250. Once an instruction is fetched in block 210, it is placed in the MIQ 250 and simultaneously delivered to the decode block 220. The instruction is decoded and sent to the execution block 230 for execution. Once the instruction has executed without causing an exception, the retire block 240 signals the MIQ 250 to discard the instruction, since at this point there is no longer a need to maintain the instruction. If an exception does occur during execution of the instruction, an instruction restart is required. Rather than re-fetching the instruction from a specialized cache or from a pre-fetch buffer, the instruction is retrieved from the MIQ 250 and presented to the decode block 220. In this way, the pipeline stage or stages associated with instruction fetch are avoided, thus reducing the performance penalty associated with instruction restart Once the instruction has been presented to the decode block, it is processed by the decode, execute, and retire blocks as previously described.

Figure 3:
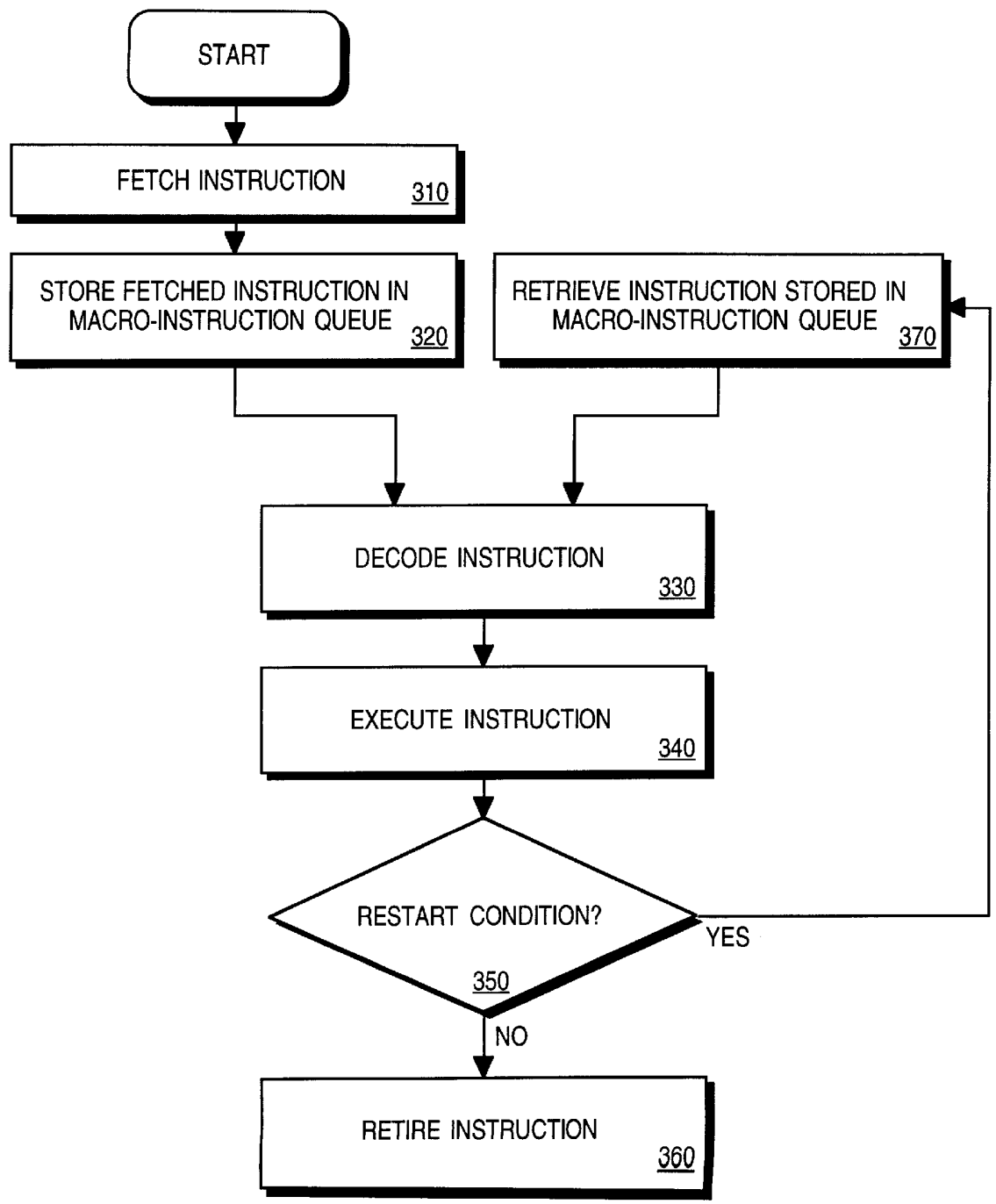
FIG. 3 is a flow diagram illustrating the operation of one embodiment of a microprocessor configured in accordance with the teachings of the present invention.

FIG. 3 is a flow diagram illustrating the operation of one embodiment of a microprocessor configured in accordance with the present invention. In step 310, an instruction is fetched. The instruction may be fetched from a prefetch queue, an instruction cache, or memory external to the microprocessor. Once the instruction has been fetched, it is stored in a Macro-Instruction Queue in step 320 and presented to the decoder. In step 330, the instruction is decoded and in step 340 the instruction is executed. In step 350, the microprocessor checks for instruction restart conditions, and if a restart condition exists the instruction is retrieved from the Macro-Instruction Queue in step 370 and presented to the decoder. Once again, the instruction proceeds through the decode step 330 and the execute step 340. Once the instruction has executed without resulting in a restart condition, the instruction is retired in step 360. The retire function includes committing the execution results to the processor state and signaling the Macro-Instruction Queue that it no longer needs to maintain the retired instruction.

Figure 4:
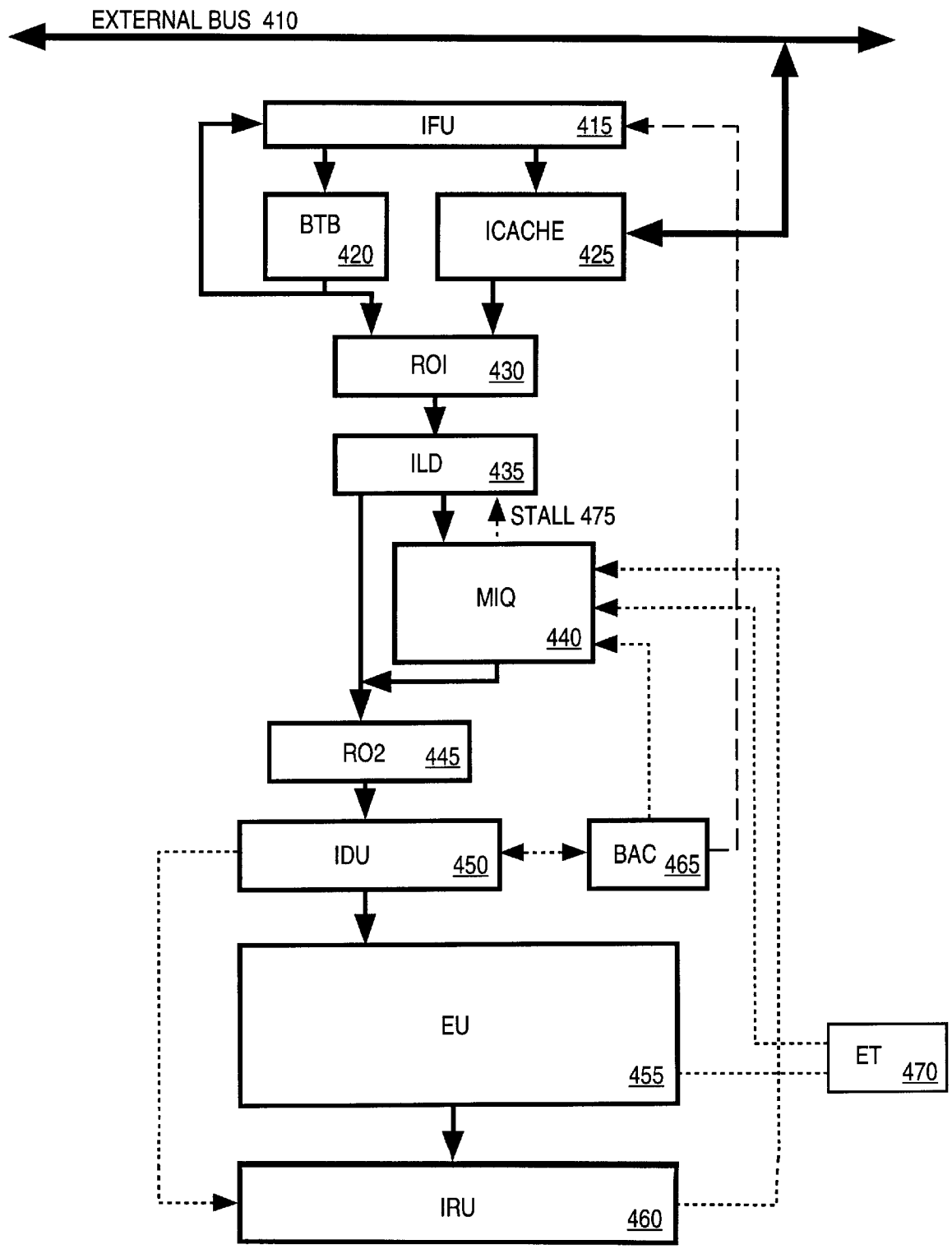
FIG. 4 is a block diagram of one embodiment of a microprocessor configured in accordance with the teachings of the present invention.

FIG. 4 is a block diagram of one embodiment of a superpipelined microprocessor implemented in accordance with the present invention. The Instruction Fetch Unit (IFU) 415 is responsible for determining the address of the next macro-instruction to be processed and is responsible for fetching that instruction. The IFU 415 interfaces with the Branch Target Buffer (BTB) 420, the Brach Address Calculator (BAC) 465, and the Instruction Cache (ICache) 425. The IFU first tries to find the macro-instruction to be fetched in the ICache 425. If the macro-instruction is determined to be located in the ICache 425, the entire appropriate cache line is sent to the first rotate stage RO1 430. In the event that the macro-instruction to be fetched is not located within the ICache 425, the appropriate instruction bytes are fetched from memory via the external bus 410. The data is placed in the ICache 425 and the appropriate cache line is presented to RO1 430.

As previously mentioned, the IFU 415 interfaces with the BTB 420 and the BAC 465. The function of the BTB 420 is to predict macro branch instructions early in the microprocessor instruction pipeline in order to prevent the processor from executing instructions down a wrong path. The BTB 420 receives as an input the starting linear address of the current macro-instruction being fetched. Based on the starting linear address, the BTB 420 produces a prediction and target address of any branch macro-instruction being fetched. The prediction and target address information is fed back to the IFU 415 resulting in the redirection of the path of macro-instruction fetch if the BTB 420 predicts a branch is taken. However, the prediction may be wrong. Therefore, all branch predictions made by the BTB 420 are verified downstream by either the BAC 465 or in a jump execution unit located within the Execution Unit (EU) 455. If the BAC 465 determines that a misprediction occurred, the IFU 415 is informed and the BTB 420 is updated. Instruction fetch then proceeds down the corrected path.

The purpose of the RO1 430 is to take 32 byte cache lines it receives from the ICache 425 and parcel it out to the Instruction Length Decoder (ILD) 435 in 8 byte segments. Also, for each cache line received, the RO1 430 appends branch prediction and target address information associated with that cache line to the 8 byte segments. The RO1 430 receives the branch prediction and target address information from the BTB 420.

The ILD 435 examines the 8 byte segment supplied to it by the RO1 430 and creates one byte of data representing any first opcode bytes contained in the 8 byte segment and creates one byte of data representing any last macro-instruction bytes contained in the 8 byte segment. In this manner, the beginning and end of each macro-instruction is marked. These two bytes of ILD 435 information are appended to the branch prediction and target address information, along with the 8 byte segment. The 8 byte segment, ILD information, and branch prediction and branch target information are presented simultaneously to the Macro-Instruction Queue (MIQ) 440 and the second rotate stage RO2 445.

Figure 5:
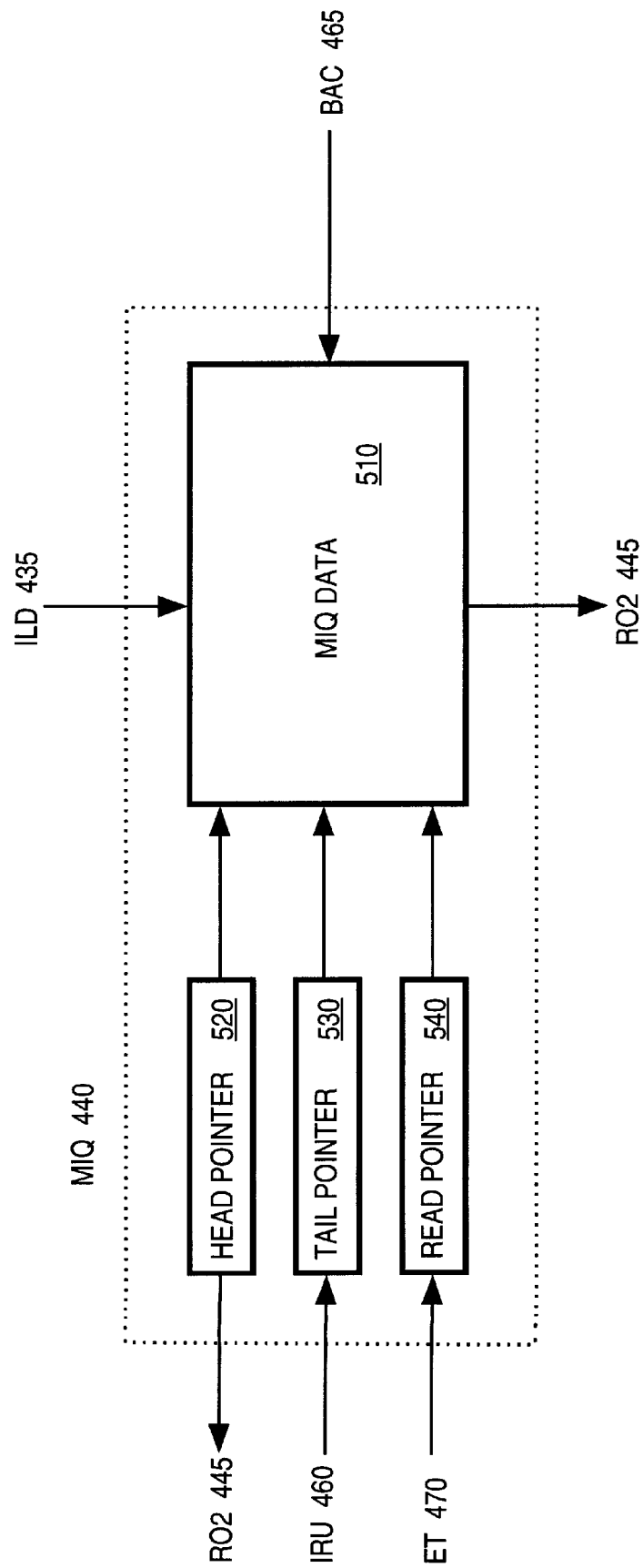
FIG. 5 is a block diagram of one embodiment of a macro-instruction queue configured in accordance with the teachings of the present invention.

The MIQ 440 is tasked with storing all macro-instructions that may be required in the event of an instruction restart condition. As previously mentioned, all of the data that is presented to RO2 445 is also presented to and stored in the MIQ 440. FIG. 5 is a block diagram of one embodiment of a macro-instruction queue implemented in accordance with the present invention. The MIQ 440 includes MIQ Data 510, Head Pointer 520, Tail Pointer 530, and Read Pointer 540. The MIQ Data 510 is shown in greater detail in FIG. 6a. In the present embodiment, the MIQ Data 510 includes 16 entries, each entry including a 64-bit Opcode field, a 32-bit Instruction Pointer (IP) field, an 8-bit Branch Target Buffer Hit (BTBH) field, an 8-bit Branch Target Buffer Predict (BTBP) field, an 8-bit first opcode byte marker (OpM) field, an 8-bit end opcode byte marker (EBM) field, and a 32-bit Branch Target field. The original 8 byte segment that the RO1 430 parsed from the 32 byte cache line is stored in the Opcode field. The branch prediction and branch target information is stored in the BTBH, BTBP, and Branch Target fields. The ILD information is stored in the OpM and EBM fields. The linear address corresponding to the first byte of the 8 byte segment is stored in the IP field.

The Head Pointer 520 is used to allocate a new entry. When the ILD 435 presents data to the MIQ 440, the Head Pointer increments, and the data is stored in the entry indicated by the Head Pointer 520. The entry number indicated by the Head Pointer 520 is communicated to RO2 445, where it is appended to the 8 byte segment, the branch prediction and branch target information, and the ILD information.

The Tail Pointer 530 is used to de-allocate entries. All entries located between the Head Pointer 520 and the Tail Pointer 530 are considered to be valid.

The RO2 445 examines the ILD information for each 8 byte segment it receives and parses out entire macro-instructions. These macro-instructions are presented to the Instruction Decode Unit (IDU) 450. The RO2 445 may be implemented to present one or more macro-instructions to the IDU 450 at a time. In the present embodiment, the RO2 445 presents up to two macro-instructions at a time to the IDU 450. The branch prediction and branch target information for each macro-instruction are also presented to the IDU 450, along with the MIQ entry information. The MIQ entry information is converted by the RO2 445 into a tag/offset format, with a 4-bit tag field indicating which MIQ entry contains the first byte of the present macro-instruction, and a 3-bit field indicating the appropriate offset into the 8 byte segment The IDU 450 decodes the macro-instructions it receives from the RO2 445, generating a stream of 64-bit micro-operations. Each macro-instruction is decoded to produce at least one micro-operation. The 64-bit micro-operations are issued to the EU 455. The 7-bit MIQ entry tags corresponding to the decoded macro-instructions are appended to the appropriate micro-operations, as show in FIG. 6b.

The IDU 450 is also coupled to the BAC 465. The BAC 465 receives decoded branch prediction information from the IDU 450. As mentioned previously, the BAC 465 checks the branch prediction. If a misprediction is discovered, the BAC 465 informs the IFU 415, so that macro-instruction fetch can begin down the correct path. The BAC 465 also updates the MIQ 440, placing corrected branch prediction information in the appropriate data fields. This is done so that in the event of an instruction restart resulting in the reuse of the macro-instruction stored in the MIQ 440, the misprediction will not be repeated.

The IDU 450 is further coupled to the Instruction Retire Unit (IRU) 460. The IDU 450 informs the IRU 460 of all micro-operations that are issued to the EU 455. In the present embodiment, the EU 455 may execute micro-operations out-of-order. The IRU 460 uses the information provided by the IDU 450 to retire the micro-operations in the original program order, as issued by the IDU 450.

The EU 455 executes the micro-operations. The EU 455 may contain a number of functional units, such as integer execution units, floating point execution units, jump execution units, etc., as is well known in the art.

The Exception Tracker (ET) 470 checks for exception conditions when the micro-operations are executed. If a micro-operation requires special handling outside the normal operation flow, a micro-coded exception handler is executed.

Once the exception handler is completed, the macro-instruction flow must be restarted from the micro-operation following the excepting micro-operation. The ET 470 uses the MIQ entry tag and signals the MIQ to load the tag into the Read Pointer 540, shown in FIG. 5. The MIQ 440 asserts a Stall signal 475, which signals the ILD 435 to cease outputting information. All MIQ entries located between the Read Pointer 540 and the Tail Pointer 530 are then presented to the IDU 450 for decoding and eventual re-execution of the micro-operations by the EU 455. Once the macro-instructions are retrieved from the MIQ 440 and presented to the RO2 445, the Stall signal 475 is negated, and the normal macro-instruction flow is restarted.

As previously mentioned, the IRU 460 retires the micro-operations in the original program order once the micro-operations have executed. Once all of the micro-operations corresponding to a macro-instruction have executed, and the execution results committed to the processor state, the IRU 460 signals the MIQ 440 to increment the Tail Pointer 530 in order to invalidate the MIQ entry or entries containing the macro-instruction. An MIQ entry can only be invalidated once all of the macro-instructions corresponding to the entry are no longer needed. Since only the MIQ entries located between the Head Pointer 520 and the Tail Pointer 530 are considered valid, incrementing the Tail Pointer serves to invalidate an MIQ entry.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A microprocessor, comprising:

an exception tracker, the exception tracker to determine whether an instruction restart condition exists;

an instruction fetch unit including an output that is disabled when an instruction restart condition is indicated;

an instruction decode unit including an input that is coupled to receive the output of the instruction fetch unit;

a queue coupled to the output of the instruction fetch unit to receive a macro instruction and further coupled to the input of the instruction decode unit, the queue to deliver the macro instruction to the instruction decode unit when an instruction restart condition is indicated.

2. The microprocessor of claim 1, wherein the queue stores branch prediction information associated with a branch macro instruction, the queue to deliver the branch prediction information to the instruction decode unit along with the branch macro instruction when an instruction restart condition is indicated.

3. The microprocessor of claim 2, wherein the queue includes a head pointer and a tail pointer for determining valid entries, the head pointer to identify an entry in the queue where the macro instruction is stored.

4. The microprocessor of claim 3, wherein the queue communicates the queue entry identified by the head pointer to a rotate unit, the rotate unit to append a tag corresponding to the queue entry onto the macro instruction prior to the macro instruction being delivered to the instruction decode unit, and further wherein the exception tracker delivers the tag to the queue when a restart condition exists, the queue to deliver the macro instruction corresponding to the tag to the instruction decode unit.

5. The microprocessor of claim 4, wherein the instruction decode unit determines an appropriated micro-operation corresponding to the macro instruction and wherein the instruction decode unit appends the tag onto the micro-operation.

6. The microprocessor of claim 5, further comprising an instruction retire unit to invalidate the queue entry where the macro instruction is stored once each micro-operation corresponding to the macro instruction has retired through manipulation of the tail pointer.

7. A microprocessor, comprising:
means for fetching a macro instruction;
means for storing the macro instruction coupled to the fetching means, the storing means including at least one storage location;
means for decoding the macro instruction to produce at least one micro-operation, the decoding means coupled to the fetching means and further coupled to the storing means, the decoding means receiving the macro instruction from the means for fetching if an instruction restart condition does not exist; and
means for detecting the instruction restart condition coupled to the storing means to trigger the storing means to deliver the macro instruction to the decoding means and to disable the fetching means if the instruction restart condition exists.

8. The microprocessor of claim 7, wherein the instruction storage means includes means for storing branch prediction information associated with a branch macro instruction.

9. The microprocessor of claim 8, wherein the instruction storage means further includes means for determining at least one valid storage location, the means for determining the valid storage location to identify the storage location containing the macro instruction.

10. The microprocessor of claim 9, further comprising:
means for assigning a tag to the macro instruction, the tag corresponding to the storage location containing the macro instruction determined by the means for determining valid storage locations; and
means for appending the tag to the macro instruction before decoding, the means for detecting the instruction restart condition to deliver the tag to the means for storing the macro instruction when a restart condition exists, the means for storing the macro instruction to deliver the macro instruction corresponding to the tag to the means for decoding the macro instruction when a restart condition exists.

11. The microprocessor of claim 10, further comprising means for appending the tag onto each of the at least one micro-operation corresponding to the macro instruction.

12. The microprocessor of claim 11, further comprising means for invalidating the storage location containing the macro instruction once all of the micro-operations corresponding to the macro instruction have been retired.

13. A method for accelerating instruction restart in a microprocessor, comprising the steps of:
fetching a macro instruction;
delivering the macro instruction to a queue and to an instruction decode unit, the queue including at least one entry, the entry including at least one data field;
storing the macro instruction in the queue;
decoding the macro instruction;
executing the macro instruction;
checking for an instruction restart condition; and
if the instruction restart condition exists, re-decoding and re-executing the macro instruction stored in the queue, the instruction decode unit to receive the macro instruction from the queue only when an instruction restart condition exists.

14. The method for accelerating instruction restart in a microprocessor of claim 13, further comprising the step of storing branch prediction information associated with the macro instruction in one of the queue data fields if the macro instruction is a branch instruction.

15. The method for accelerating instruction restart in a microprocessor of claim 14, wherein the queue includes a head pointer and a tail pointer for determining valid queue entries, the head pointer to identify an entry in the queue where the macro instruction is stored.

16. The method for accelerating instruction restart in a microprocessor of claim 15, further comprising the steps of:
assigning a tag to the macro instruction, the tag identifying the entry where the macro instruction is stored as indicated by the head pointer;
appending the tag to the macro instruction before execution;
delivering the tag to the queue when a restart condition exists; and
delivering the macro instruction corresponding to the tag from the queue to the instruction decode unit when a restart condition exists.

17. The method for accelerating instruction restart in a microprocessor of claim 16, further comprising the step of invalidating the queue entry where the macro instruction is stored once the macro instruction has been successfully executed, the step of invalidating the queue entry accomplished through manipulation of the tail pointer.

* * * * *

UNITED STATES PATENT AND TRADEMARK OFFICE
CERTIFICATE OF CORRECTION

PATENT NO.   : 5,944,818
DATED        : August 31, 1999
INVENTOR(S)  : Baxter et al.

It is certified that error appears in the above-identified patent and that said Letters Patent is hereby corrected as shown below:

Column 2,
Lines 2 and 4, delete "prefecth" and insert -- prefetch --.
Line 3, delete "positions" and insert -- positioned --.
Line 8, delete "insturctions" and insert -- instructions --.
Line 14, delete "depthes" and insert -- depths --.
Line 15, delete "preformance" and insert -- performance --.
Line 16, after "need" insert -- to --.
Line 28, after "to" insert -- the --.

Signed and Sealed this

Twenty-fifth Day of March, 2003

JAMES E. ROGAN
*Director of the United States Patent and Trademark Office*